June 27, 1939.  R. W. OAKLEY  2,163,802
PLANT-SETTING MACHINE
Filed Dec. 23, 1936    2 Sheets-Sheet 1
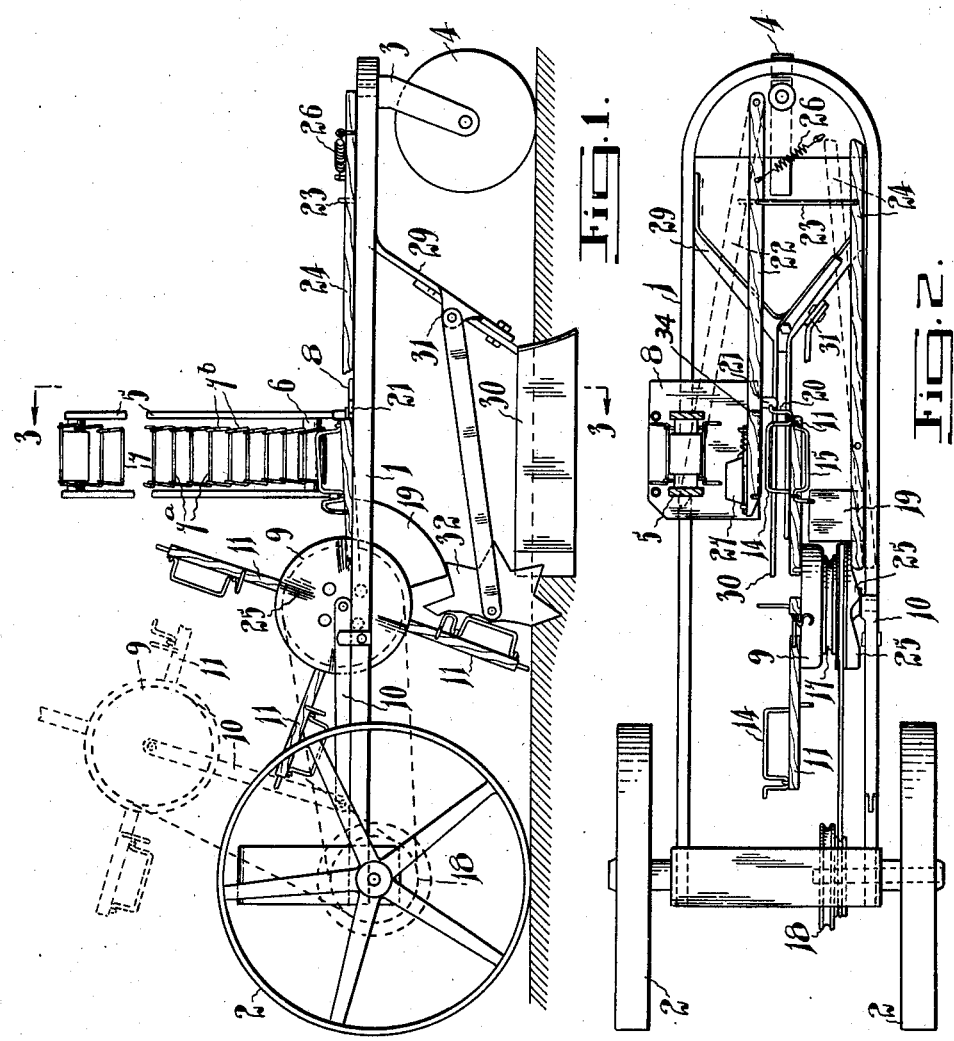
Inventor
R. W. Oakley
By George P. Mackie Att'y.

June 27, 1939.  R. W. OAKLEY  2,163,802
PLANT-SETTING MACHINE
Filed Dec. 23, 1936  2 Sheets-Sheet 2
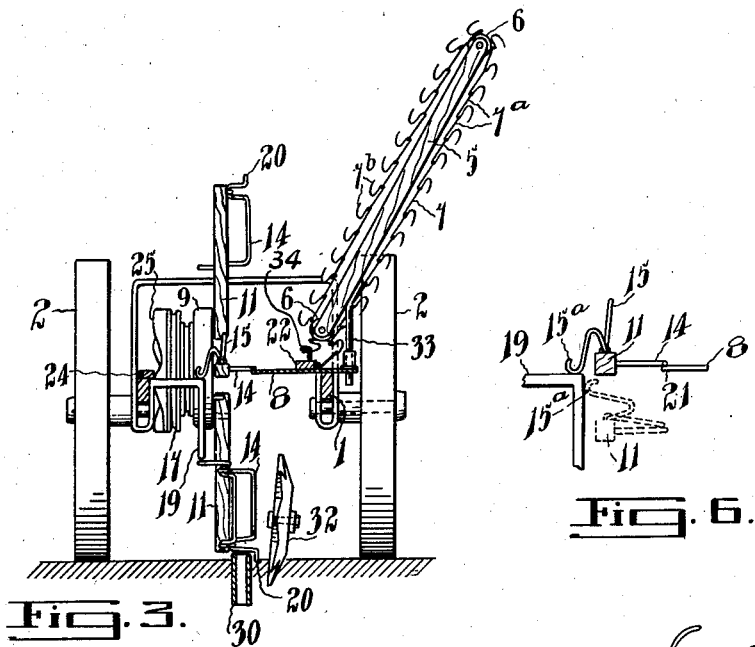
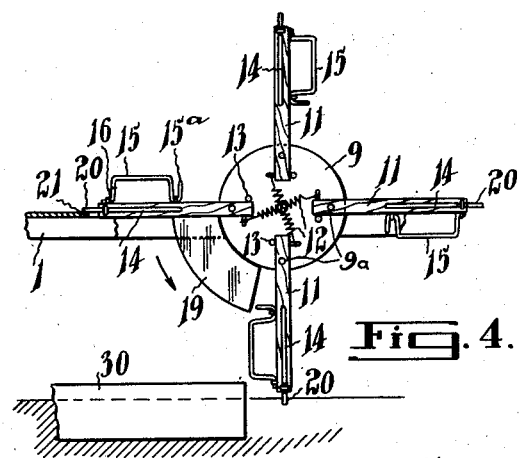
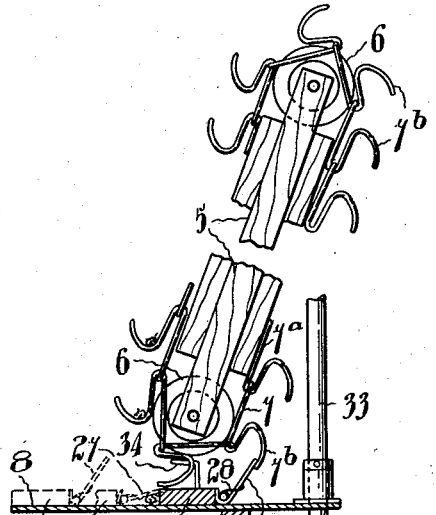
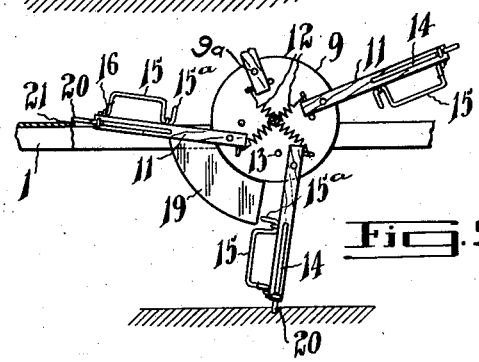
Inventor
R. W. Oakley
By George P. Mackie
Att'y.

Patented June 27, 1939

2,163,802

UNITED STATES PATENT OFFICE 2,163,802

PLANT-SETTING MACHINE

Robert W. Oakley, Toronto, Ontario, Canada

Application December 23, 1936, Serial No. 117,364

9 Claims. (Cl. 111—3)

This invention relates to a machine for transplanting or rather for setting small plants, such as flower, cabbage, tobacco and similar plants, in the ground at regular intervals, and the object of the present invention is broadly to devise a machine which will open up a furrow, deposit or set the plants, and subsequently cover the roots of the plants.

I attain my object by means of the constructions hereinafter described and illustrated in the accompanying drawings in which Fig. 1 is a side elevation of the apparatus;

Fig. 2 a plan view;

Fig. 3 a cross section on the line 3—3 in Fig. 1;

Fig. 4 an elevation of the planting wheel;

Fig. 5 a similar view with the parts in another position;

Fig. 6 a detail showing the method of operating the gripper members; and

Fig. 7 a side view of the conveyor.

In the drawings like numerals of reference indicate corresponding parts in the different figures.

Referring to Figs. 1 and 2, 1 indicates a horizontal frame for carrying the various operating parts, which frame is supported at its rear end by ground wheels 2. At its forward end, to facilitate steering the frame is provided with a pivoted support having a ground wheel 4.

Supported on the frame 1 is a transversely directed endless belt conveyor comprising a frame 5 secured at its lower end to the frame 1 and provided with rollers 6 which carry the endless conveyor 7. This conveyor comprises metal plant-carrying links 7ª connected together, the ends of which are bent up to form spaced pairs of hooks 7ᵇ which prevent the plants from falling away until such time as it is desired to deposit them on the table 8 on the frame 1 ready for transference to the planting wheel. This planting wheel comprises a central hub portion 9 which is journalled on an arm 10 fulcrumed on the frame 1 so that it may occupy either the working position as shown in full lines in Fig. 1, or the inoperative position as shown in dotted lines.

Pivoted at 9ª on the hub portion 9 are plant carrying arms 11.

It is desired that these arms normally extend radially of the hub. Stops 13 are therefore provided to prevent the rocking of these arms in one direction, while springs 12, while permitting the arms to move in the opposite direction, tend to always return the arms to the radial position.

These arms each carry a stationary plant gripper member 14 and a movable gripper member 15. Springs 16 normally tend to move the movable gripper members 15 out of gripping position.

The planter hub 9 is provided with a drive wheel 17 by means of which it may be driven from a drive wheel 18 on the rear axle. Preferably the drive wheels 17 and 18 are of the multiple type, the sections being of different sizes to permit the driving of the planter wheel at different speeds relative to the rotation of the ground wheels 2.

As will be apparent from the above description, the movable gripper members 15 are normally held out of gripping position by means of the springs 16. It is desired that they occupy a plant gripping position, however, from the time the plants are received by the planter wheel until the plants have been set. I therefore provide each gripper member 15 with an operating arm extension 15ª, which is adapted to engage a cam member 19 on the frame, which cam member is of a length to cause said movable grippers to move to closed position just as the arm carrying the grippers leaves the plant receiving position and to move to open position when the arm is at the plant setting position.

It is desired that the arms be caused to lag somewhat as the grippers receive the plants, and to again lag as the grippers release the plants. I therefore provide each arm with an extension 20 which is of a length to engage a shoulder 21 on the frame, as will be seen in Figs. 4 and 5 to hold back its particular arm while the grippers are receiving a plant, and to engage the earth to hold back the arm while the plant is being released.

As heretofore stated, the plants are deposited from the conveyor on to the platform 8, and to transfer the plants from the platform to the grippers on the planting wheel, I provide the lever 22 pivoted on the frame 1 and rocking parallel with its upper surface. This lever in turn is connected by a link 23 with a second lever 24 pivoted intermediate its ends on the frame 1. This lever 24 is arranged to be rocked by cam surfaces 25 on the planter hub 9. These cam surfaces are preferably detachable so that one or more of them may be removed or their spacing adjusted if desired. A spring 26 connected at one end to the lever 22 and at its other end to the frame tends to rock said levers to hold the lever 24 in engagement with the cam surfaces. To remove the plants from the hooks 7ᵇ and carry them to the planting wheel, the member 22 is provided with plant-engaging members 34 as shown in Fig. 7.

Referring to Fig. 2 it will be seen that the lever 22 moves across the platform 8 from a position below the conveyor to the inner edge of the platform. The lever 22 is employed to actuate the conveyor step by step to feed the plants on to the platform, the lever having a conveyor operating member 27 pivoted on its side, a coil spring 28 being provided tending to hold the member inclined upwardly. As will be seen from Fig. 7, the conveyor engaging end is normally raised so that when the lever is rocked, said end will engage the hook 7b on the conveyor links 7a and thus move the conveyor while on the return movement of the lever, the member may rock downwardly to pass under the hooks, immediately rising after clearing the latter.

Pivoted on a bracket 29 below the frame is a plow 30, which is adapted to open a furrow to receive the plants. The planting wheel is arranged to deposit the plants immediately behind the plow before the earth commences to fall in. Means, not shown, may be provided for depositing at the same time a quantity of water to moisten the earth about the roots of the plant. When not in use, the plow may be swung on its pivot so that it clears the earth when travelling.

On a bracket 31 extending rearwardly from the plow support is mounted a packing wheel, 32 for packing the earth into firm contact with the roots of the plant.

Preferably the frame 5 for the endless belt conveyor is made detachable from the frame 1, to facilitate the loading with plants of a number of these and their ready substitution on the machine as each conveyor is emptied. The frame 1 is provided with sockets to receive posts 33 which support the frame 5.

The operation of the apparatus is as follows. The plants are deposited by an operator one by one on the links of the conveyor. As the planter is drawn forwardly, the planting wheel is rotated, and through the engagement of the lever 24 with the cam surfaces 25, said lever 24 and also the lever 22 are actuated. The outward movement of the lever 22 causes a step-by-step advance of the conveyor and the depositing one by one of the plants on the platform 8. The inward movement of the lever 22 moves the deposited plant from the platform on to the stationary gripper 14 on an arm 11. As the planting wheel continues to rotate the extension 15a on the movable gripper 15 is engaged by the cam 19, thus moving the gripper 15 to engage the plant and retain it in place until it reaches the planting position, at which point the extension 15a has become disengaged from the cam 19, allowing the spring 16 to move the movable gripper out of operative position.

It will be noted that at the loading position each arm 11 is retarded by the engagement of its pin 20 with the shoulder 21, thus giving plenty of time for loading, the springs 12, after the pin 20 disengages the shoulder 21, advancing the arm to its normal radial position.

Similarly at the planting position, the pin 20 engages the earth at the side of the furrow and retards the arm while the plant is released for planting.

After the plant has been set, the earth falls in the furrow behind the plow and the packer wheel packs it into intimate contact with the root.

What I claim as my invention is:

1. In a plant-setting machine, the combination of a wheeled frame; a planting wheel rotatably mounted on said frame, said wheel comprising a hub portion; a plurality of plant-carrying arms pivoted on said wheel, stops on said hub for limiting the rocking of said arms in one direction; and resilient means normally tending to prevent the rocking of said arms in the other direction; and a shoulder on said frame with which said arms are adapted to engage when in plant receiving position to rock the arms against the action of the resilient means, each of said arms having a plant gripping member pivoted thereon; and means on said frame for holding said members in gripping position while travelling from plant-receiving to plant releasing position.

2. In a plant setting machine, the combination of a wheeled frame; a planting wheel rotatably mounted on said frame; a plant receiving platform on said frame; an endless conveyor for feeding plants to said platform; a lever projecting across said platform and rockable in a horizontal plane for moving plants to the planting wheel; means for actuating said lever from the planting wheel; and means carried by said lever for actuating said endless conveyor.

3. In a plant setting machine, the combination of a wheeled frame; a planting wheel rotatably mounted on said frame; a plant receiving platform on said frame; an endless conveyor for feeding plants to said platform; a lever pivoted on said frame projecting across said platform for moving plants to the planting wheel; means for actuating said lever from the planting wheel; a member pivoted on said lever; spring means normally tending to hold said member in the path of the conveyor, and shoulders on said conveyor with which said member engages when moving in one direction and over which said member rides when moving in the other direction.

4. In a plant setting machine, the combination of a wheeled frame; a planting wheel rotatably mounted on said frame; a plant receiving platform on said frame; an endless conveyor for feeding plants to said platform; a lever pivoted on said frame projecting across said platform for moving plants to the planting wheel; means for actuating said lever from the planting wheel; a member pivoted on said lever; spring means normally tending to hold said member in the path of the conveyor, and shoulders on said conveyor with which said member engages when moving in one direction and over which said member rides when moving in the other direction; said shoulders being formed as open jaws for carrying plants.

5. In a plant setting machine the combination of a wheeled frame; a plant-receiving platform on said frame; a planting wheel for transferring plants from said platform to setting position; a cam member carried by said wheel; and means operated by said cam member for moving plants from the platform to the planting wheel comprising a pair of connected levers one of which extends over said platform; and means for resiliently holding the other lever against the cam.

6. In a plant-setting machine, the combination of a wheeled frame; a planting wheel rotatably mounted on said frame, said wheel comprising a hub portion; a plurality of plant-carrying arms pivoted on said wheel, stops on said hub for limiting the rocking of said arms in one direction; and resilient means normally tending to prevent the rocking of said arms in the other direction; and a shoulder on said frame with which said arms are adapted to engage when in plant receiving position to rock the arms against the action of the resilient means; and means for feeding plants to each of said plant-carrying arms as it is in engagement with said shoulder, each of said arms having a plant gripping member pivoted thereon; and means on said frame for holding said members in gripping position while travelling from plant-receiving to plant-releasing position.

7. In a plant-setting machine, the combination of a wheeled frame; a planting wheel rotatably mounted on said frame, said wheel comprising a hub portion; a plurality of plant-carrying arms pivoted on said wheel, stops on said hub for limiting the rocking of said arms in one direction; and resilient means normally tending to prevent the rocking of said arms in the other direction; and a shoulder on said frame with which said arms are adapted to engage when in plant receiving position to rock the arms against the action of the resilient means; a plant receiving platform on said frame; an endless conveyor for feeding plants to said platform; a lever projecting across said platform and rockable in a horizontal plane for moving plants to the planting wheel; means for actuating said lever from the planting wheel; and means carried by said lever for actuating said endless conveyor.

8. In a plant-setting machine, the combination of a wheeled frame; a planting wheel rotatably mounted on said frame, said wheel comprising a hub portion; a plurality of plant-carrying arms pivoted on said wheel, stops on said hub for limiting the rocking of said arms in one direction; and resilient means normally tending to prevent the rocking of said arms in the other direction; and a shoulder on said frame with which said arms are adapted to engage when in plant receiving position to rock the arms against the action of the resilient means; a plant receiving platform on said frame; and endless conveyor for feeding plants to said platform; a lever pivoted on said frame projecting across said platform for moving plants to the planting wheel; means for actuating said lever from the planting wheel; a member pivoted on said lever; spring means normally tending to hold said member in the path of the conveyor, and shoulders on said conveyor with which said member engages when moving in one direction and over which said member rides when moving in the other direction.

9. In a plant-setting machine, the combination of a wheeled frame; a planting wheel rotatably mounted on said frame, said wheel comprising a hub portion; a plurality of plant-carrying arms pivoted on said wheel, stops on said hub for limiting the rocking of said arms in one direction; and resilient means normally tending to prevent the rocking of said arms in the other direction; and a shoulder on said frame with which said arms are adapted to engage when in plant receiving position to rock the arms against the action of the resilient means; a plant-receiving platform on said frame; a cam member carried by said planting wheel; and means operated by said cam member for moving plants from the platform to the planting wheel comprising a pair of connected levers one of which extends over said platform; and means for resiliently holding the other lever against the cam.

ROBERT W. OAKLEY.